W. A. GUNNING.
OPHTHALMIC MOUNTING.
APPLICATION FILED NOV. 27, 1920.
1,434,889.
Patented Nov. 7, 1922.
2 SHEETS—SHEET 1.
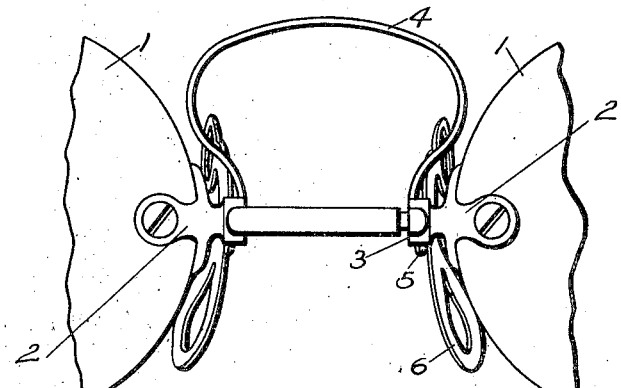
Fig. I
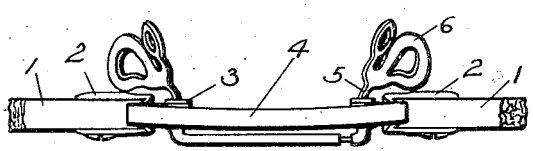
Fig. II
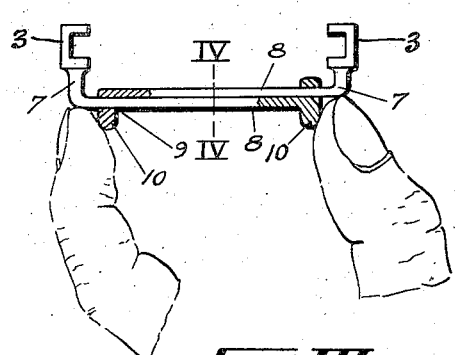
Fig. III
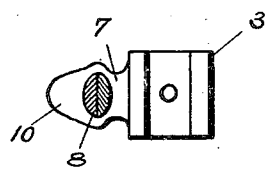
Fig. IV
INVENTOR
WILLIAM A. GUNNING
BY
H. H. Styll & H. K. Parsons
ATTORNEYS W. A. GUNNING.
OPHTHALMIC MOUNTING.
APPLICATION FILED NOV. 27, 1920.
1,434,889.
Patented Nov. 7, 1922.
2 SHEETS—SHEET 2.
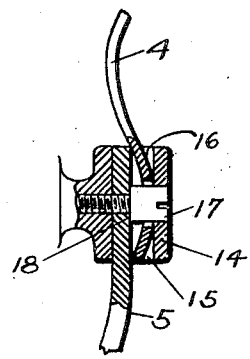
Fig. V
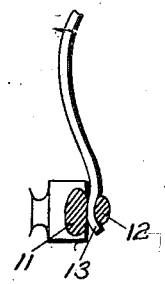
Fig. VI
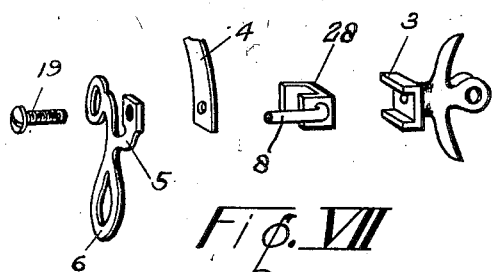
Fig. VII
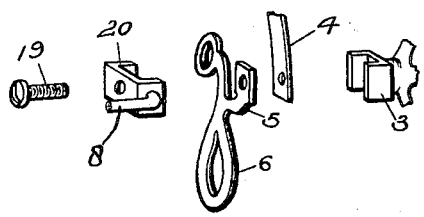
Fig. VIII
INVENTOR
WILLIAM A. GUNNING
BY
H.H. Styll & H.K. Parsons
ATTORNEYS Patented Nov. 7, 1922.

1,434,889

UNITED STATES PATENT OFFICE.

WILLIAM A. GUNNING, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed November 27, 1920. Serial No. 426,715.

*To all whom it may concern:*

Be it known that I, WILLIAM A. GUNNING, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to an improved construction of mounting intended to be maintained on the face through the operation of spring actuated guards.

The leading object of the present invention is the provision of a novel and improved construction of mounting which shall possess all the advantages both as to appearance, durability and satisfactory retention on the face of the old high spring bridge type of mounting, and which in addition shall possess the advantage that the lenses are securely retained in proper axial position on the face, and that the mounting may be satisfactorily applied to or removed from the face with one hand in place of requiring two hands for its proper manipulation.

A further object of the present invention is the provision of an improved mounting which shall be operable with one hand, but which shall eliminate objectionable pivot screws, swinging guard arms and the like.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvements.

Figure II represents a plan view thereof.

Figure III represents a transverse sectional view.

Figure IV represents a sectional view as on the line IV—IV of Figure III.

Figure V represents a detail view of one form of spring attaching connection.

Figure VI represents a similar view of another form.

Figure VII represents a perspective view of a structure adapted for attachment to a standard frame to equip with my improved features.

Figure VIII represents a similar view of another form of the invention.

In the drawings, the numeral 1 designates the lenses of an ophthalmic mounting retained in the usual lens clips or attachments 2, which are illustrated as provided with the stud box portions 3 suitably receiving the ends of a spring member 4 of the hook spring bridge type. These stud boxes also serve to receive the arms 5 of the guard members 6 which are actuated toward each other by the spring 4 to grip the nose and properly retain the mounting in position on the face. It is to be understood that these parts may be made of stock construction and, therefore, they require no particular description.

Carried as by the stud box portions 3, however, are the forwardly extending arms 7 having the overlying slide portions 8 which are provided at their termini with an eye or guide loop 9 through which the opposite bar slides, to hold them against angular movement and being further provided at or adjacent said loops with the projecting lugs 10 adapted to serve as handles for the manipulation of the guide bars 8. In use when the lugs 10 are pressed together they serve to shift the arms 8 with respect to each other separating said arms and thus the guards to facilitate placing of the mounting upon or removal of the mounting from the face. At the same time their interlocking relationship as secured by the loop portions 9 serves to insure a parallel or direct horizontal movement of the arms which on account of their attachment to the lens clips serve to at all times brace and secure the lenses in horizontal position with their axes in predetermined position in place of the axis, in the case of a cylinder lens, being changed or varied according to how the mounting is adjusted or placed on the face, a defect hitherto present in practically all spring bridge structures.

It will be understood that the action of the spring 4 in connection with this construction is somewhat different from that hitherto existing, in that in place of the spring being merely bent or open with lenses being bent up as has been the practice in previous constructions, the action is a direct opening action, with the result that there is a flexion of the spring adjacent its points of attachment and also in its upper loop portion. To facilitate the free action of the spring at its points of attachment I may if desired make use of spring engaging members of other than standard construction. For example, I may employ the structure shown in Figure VI comprising the back lug 11 carried by the stud box portion 3 and the loop member 12, the spring fitting between said parts with a rocking movement having its end hooked as at 13, or rounded to prevent accidental disengagement of the parts and permitting of the spring being snapped into place and of its ready removal when necessary.

A different form of the structure is shown in Figure V in which a closed stud box 14 is employed having a loose open space 15 in which the spring plays, the spring being bowed as at 16 to fit within the recess and loosely engaged on the stud screw 17 which has a shoulder 18 clampingly engaging the guard arm 5 to rigidly secure it in place.

In Figures VII and VIII, I have illustrated two forms of the invention particularly intended to adapt ordinary spring bridge mountings to my improvement. In Figure VII, I have shown the supplemental stud box portion 28 adapted to fit within the regular stud box 3 and to receive the ends of the spring and guard, the single stud screw 19 properly connecting all of the parts and the mounting being thus supplied with my improved cross bars 8 and operating handles 10 which are carried by said supplemental stud portion 28. Figure VIII shows a slight modification in which the stud box 3 is employed, receiving the tongues of the spring and guard arm and an overlying cap plate 20 fits over the stud box 3 holding the guard and spring in place and being itself secured as by the stud screw 19.

From the foregoing specification taken in connection with the accompanying drawings the construction of these several parts will be readily apparent, and it will be seen that in all instances I have provided an improved structure rigidly holding the lens attachments and thus the lenses against rotative displacement of their axes, an extremely important matter in connection with cylindrical lenses, a structure in which the glasses may be easily manipulated with one hand in place of two, and eliminating pivoted gripping members, etc., with very small springs, and making use of a single substantially central spring member 4 insuring equal pressure and proper gripping action against both sides of the nose.

I claim:

1. In a device of the character described, a combination of a pair of overlapping guide bars each having at one end an attaching portion, and at the opposite end an enlarged lug, each of the enlarged lugs being slotted to provide a guide way for the opposed bar and having a forwardly extending portion providing a fingerpiece or handle for manipulation of the device.

2. A device of the character described, including overlying steadying bars, means for relatively shifting the bars, stud boxes carried by the bars, a bow spring connecting the stud boxes, nose gripping means and fastening devices for securing the nose gripping means and ends of the spring to the stud boxes.

3. An ophthalmic mounting, including a pair of lens attachments, interlocking sliding bars connecting said lens attachments to prevent relative angular movement of said parts, and an upwardly looped member independent of said connection resiliently connecting the lens attachments for actuating the same in a direction toward each other.

In testimony whereof I have affixed my signature, in presence of two witnesses.

WILLIAM A. GUNNING.

Witnesses:
ESTHER M. LAFLER,
ALICE G. HASKELL.